A. T. KILLIAN.
THRUST BEARING.
APPLICATION FILED MAR. 5, 1909.

939,269.

Patented Nov. 9, 1909.

Witnesses:
Edwin L. Yewell
A. K. Bridges

Inventor:
Albert T. Killian
By Davis & Davis
Attorneys

UNITED STATES PATENT OFFICE.

ALBERT T. KILLIAN, OF BUFFALO, NEW YORK, ASSIGNOR, BY DIRECT AND MESNE ASSIGNMENTS, TO NATIONAL ANTI-FRICTION ROLLER-BEARING COMPANY, OF BUFFALO, NEW YORK, A CORPORATION OF NEW YORK.

THRUST-BEARING.

939,269.  Specification of Letters Patent.  Patented Nov. 9, 1909.

Application filed March 5, 1909. Serial No. 481,238.

*To all whom it may concern:*

Be it known that I, ALBERT T. KILLIAN, a citizen of the United States of America, and a resident of Buffalo, in the county of Erie and State of New York, have invented new and useful Improvements in Thrust-Bearings, of which the following is a specification.

My invention relates especially to an anti-friction thrust-bearing in which radial bearing-rollers are preferably contained between two roller-races and held in properly spaced relation by separating rollers arranged so as to prevent the bearing-rollers contacting with each other, and it has for its object, mainly, to provide a bearing which will be simple and inexpensive in construction and in which, at the same time, the friction shall be reduced to a minimum.

Another object of this invention is to provide a roller thrust-bearing in which the use of balls is rendered unnecessary and in which the endwise strain imposed upon the load-sustaining bearing is entirely eliminated.

Another object of this invention is to provide a roller thrust-bearing which can be used either on vehicles or with machinery shafting, that is, where there is a tendency to endwise motion, this construction being such that no matter how much or how great this endwise motion may be, it will not alter, injure, or interfere with the efficiency of the bearing.

A further object of this invention is to provide a roller thrust-bearing in which the rollers will be evenly held, and in which the parts can be assembled and handled as a unitary body.

With these and other objects in view, the invention may be embodied in the form described in this specification and shown in the accompanying drawings, in which—

Figure 1:
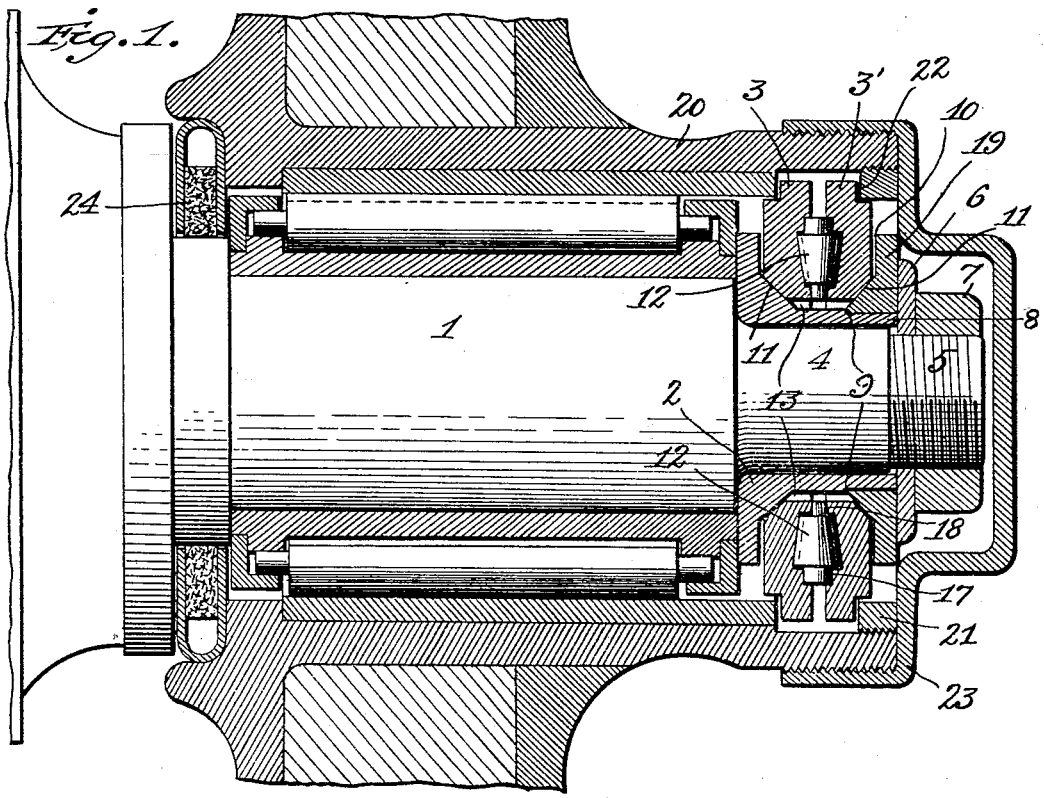
Figures 2, 3:
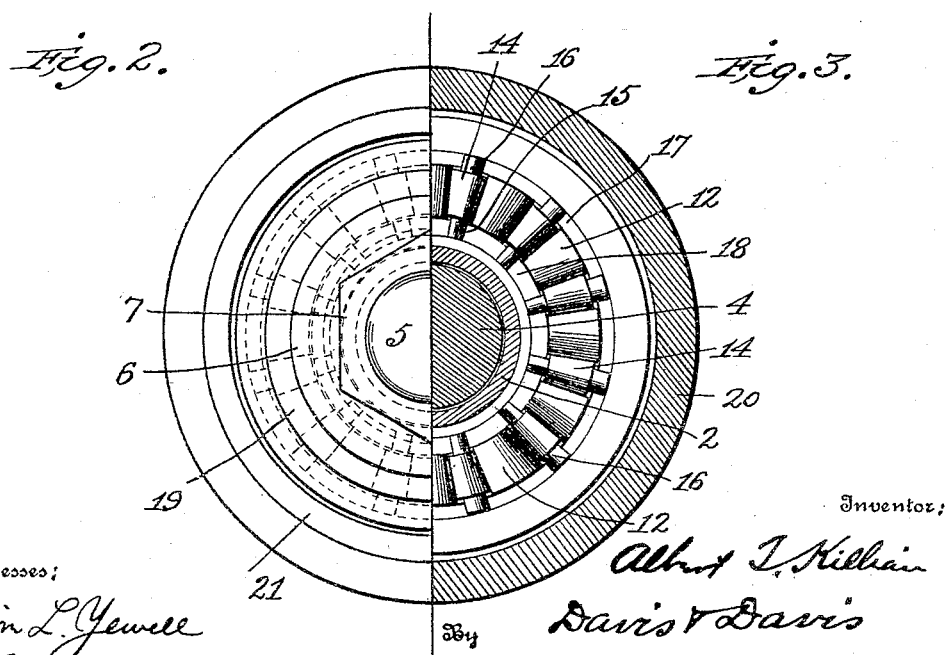

Figure 1 is a longitudinal sectional view of my bearing as applied to the front axle of an automobile; Fig. 2 is an end view with the dust-cap removed; and, Fig. 3 is an end view through the center.

Referring to the drawings by reference characters, 1 designates an axle with reduced portion 4, and threaded portion 5, at its end, which is adapted to receive washer 6 and nut 7. Fitting loosely on reduced portion 4, is a locking sleeve 2 which has a reduced portion 8 at its end forming a shoulder 9. Fitting securely and rigidly on reduced portion 8 and abutting against shoulder 9, is a removable circular flange 19, forming an annular channel 10, which is provided at its inner corners with annular tapering surfaces 11. Within channel 10 are annular rings 3, 3', forming roller races, which move freely and are separated by radial tapering bearing-rollers 12. The inner corners of the roller-races are beveled off to provide oppositely-inclined annular tapering surfaces, similar to beveled faces 11 but of shorter length to form the annular recess 13 for purposes hereinafter described. Bearing rollers 12 are separated by tapering dividing rollers 14 which are provided at their ends with reduced tapering portions 15 and 16 which bear on circular tracks 17 and 18. These spacing rollers 14 are smaller in diameter than the main rollers so that they receive none of the thrust-strain but act solely as freely-supported spacing means.

In order to assemble the parts, I place within the locking sleeve 2 the inner roller-race, and within said roller-race a bearing-roller 12, and then place a dividing roller next to said bearing-roller. I then place another bearing-roller within the race next to the dividing roller, and then another dividing-roller next to this bearing-roller, and repeat this operation until the circular series is completed. I then put the remaining roller-race within the locking sleeve in contact with the bearing-rollers, and then slip the removable circular flange 19 over the end of locking-sleeve until it abuts shoulder 9, fasten the same securely thereon, the proportions of the parts being such as to provide sufficient clearance between the exterior sides of the roller-races and the interior sides of the flanges of the locking sleeve to permit the roller-races to move and rotate freely therein. The thrust-bearing is then inserted in the outer end of hub 20 and is held in place by stop ring 21 which is screwed in until it approaches closely to shoulder 22 on the outer roller-race and so located as to maintain the same amount of clearance as between flanges of the locking sleeve. The hub is slipped upon the axle and is held in place thereon by washer 6 and nut 7. I then screw on the end of the hub a cap 23 which excludes dust from the bearing.

The operation of this invention is as follows: When the hub is rotated it will have a tendency to move longitudinally and thereby bring into action the trust-bearing. Should the hub have an outward movement, it will cause the inner roller-race member to revolve on the bearing rollers in the same direction as the hub, while the outer roller-race member contacts with the inside of outer flange 19 of the locking-sleeve and remains stationary with the axle. Should the hub have an inward movement, it will cause the outer roller-race member to revolve on the bearing rollers in the same direction as the hub, while the inner roller-race member contacts with the inner side of the inner flange of the locking-sleeve and remains stationary with the axle. To make these operations possible, I have provided the described clearance between the roller-races and the locking-sleeve flanges, and between the roller-races and the hub-shoulders. I have also provided the annular tapering surfaces 11 between the roller-races and the locking-sleeve, but of shorter length on the roller-races so as to form the annular recess 13 between said roller-races and the locking-sleeve, so that when the hub engages the roller-race both will be free to rotate without any frictional contact.

24 is a dust-proof washer to exclude dust from the bearings. It is an annular trough of pressed sheet-steel fitted with felt and closed at its outer edge.

Having thus fully described my invention, what I claim as new, and desire to secure by Letters Patent, is:—

1. In combination with a shaft or axle and a relatively rotatable hub thereon, a locking-sleeve on the axle provided with annular radial flanges forming an annular channel, one of the flanges being removably fastened on the sleeve and the inner corners of the channel being oppositely beveled, a pair of raceway rings inclosed in said channel and having their inner corners beveled off, these beveled surfaces being shorter than the coöperating beveled surfaces in the aforesaid channel, the adjacent faces of said raceways being provided with annular grooves, and antifriction rolling elements in said grooves, the hub being provided with shoulders engaging the outer sides of said annular raceways or rings, for the purpose set forth.

2. In combination with a shaft or axle and a hub thereon, of a locking-sleeve on the axle provided with annular flanges forming a channel, independently rotatable raceway-rings in said channel and adapted to frictionally engage the opposite flanges of the sleeve, rolling elements between said rings, and shoulders on the hub adapted to frictionally engage the outer edges of said rings, for the purpose set forth.

3. In combination, a shaft and a rotatable hub thereon, a pair of rings surrounding the axle and having engagement therewith and also with the hub and having their adjacent faces provided with annular grooves and tracks whose faces are oppositely beveled, a series of radially arranged thrust-receiving rollers, and a series of radially arranged spacing-rollers smaller in diameter than the thrust-rollers and having reduced end-extensions running on said tracks, for the purpose set forth.

In testimony whereof I hereunto affix my signature in the presence of witnesses this 22nd day of February 1909.

ALBERT T. KILLIAN.

Witnesses:
RALPH E. HEARD,
FREDERICK D. TRACY,
E. A. WINSHIP.